July 7, 1970
J. CROSSLEY
3,518,950
ROTARY TABLET-MAKING MACHINES
Filed Jan. 10, 1968
2 Sheets-Sheet 2
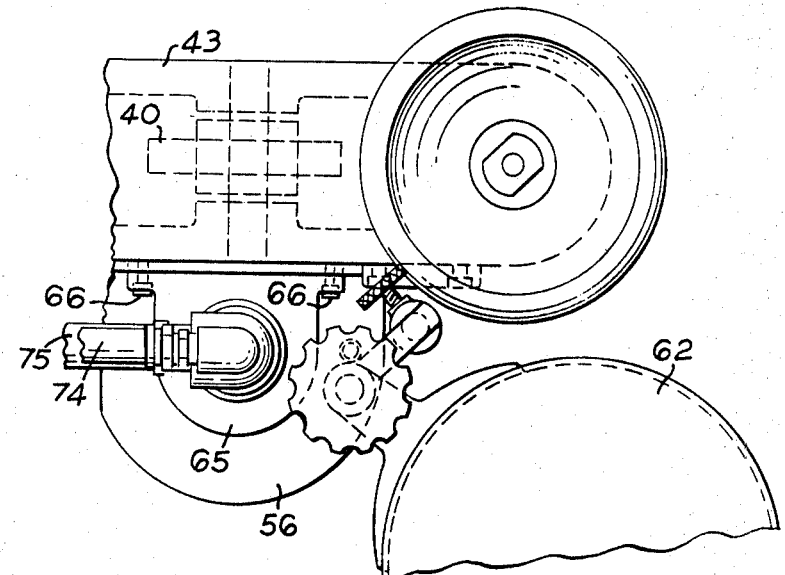
Fig. 2.
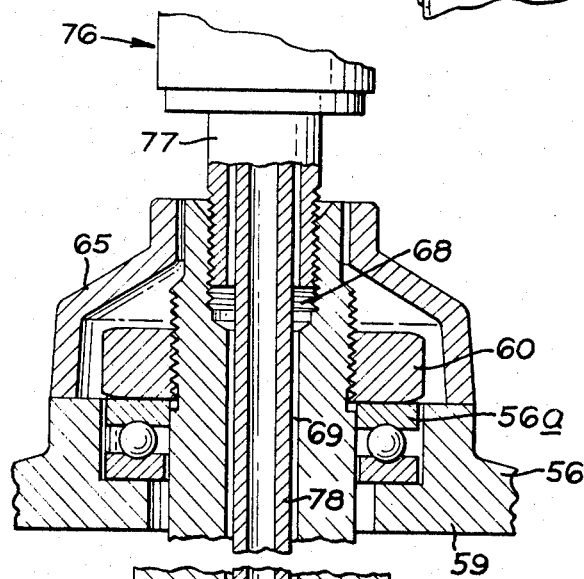
Fig. 3.
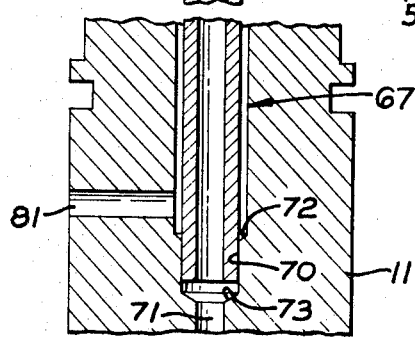
INVENTOR:
JACK CROSSLEY
BY Kenwood Ross
ATTORNEY.

United States Patent Office 3,518,950
Patented July 7, 1970

3,518,950
ROTARY TABLET-MAKING MACHINES
Jack Crossley, Liverpool, England, assignor to Manesty Machines Limited, Liverpool, England, a British company
Filed Jan. 10, 1968, Ser. No. 700,669
Claims priority, application Great Britain, Jan. 13, 1967, 1,906/67
Int. Cl. B29b 1/02
U.S. Cl. 107—17                                      2 Claims

ABSTRACT OF THE DISCLOSURE

Rotary tablet-making machines of the type incorporating a rotary turret having a die plate or table and formed with top and bottom punch guides accommodating respective punches cooperating with corresponding dies in the die plate and means for supplying granular or pulverulent material to the dies to be compressed into tablet form by the punches, the turret of the machine being hollow and having means to permit circulation of a cooling fluid therethrough, said means comprising, a bore extending axially of the drive shaft and connecting, by way of a rotary coupling, with feed and return pipes, a tube extending within the bore of the drive shaft and defining therewith feed and return passages connected with the feed and return pipes and with the interior of the turret.

---

Figure 1:
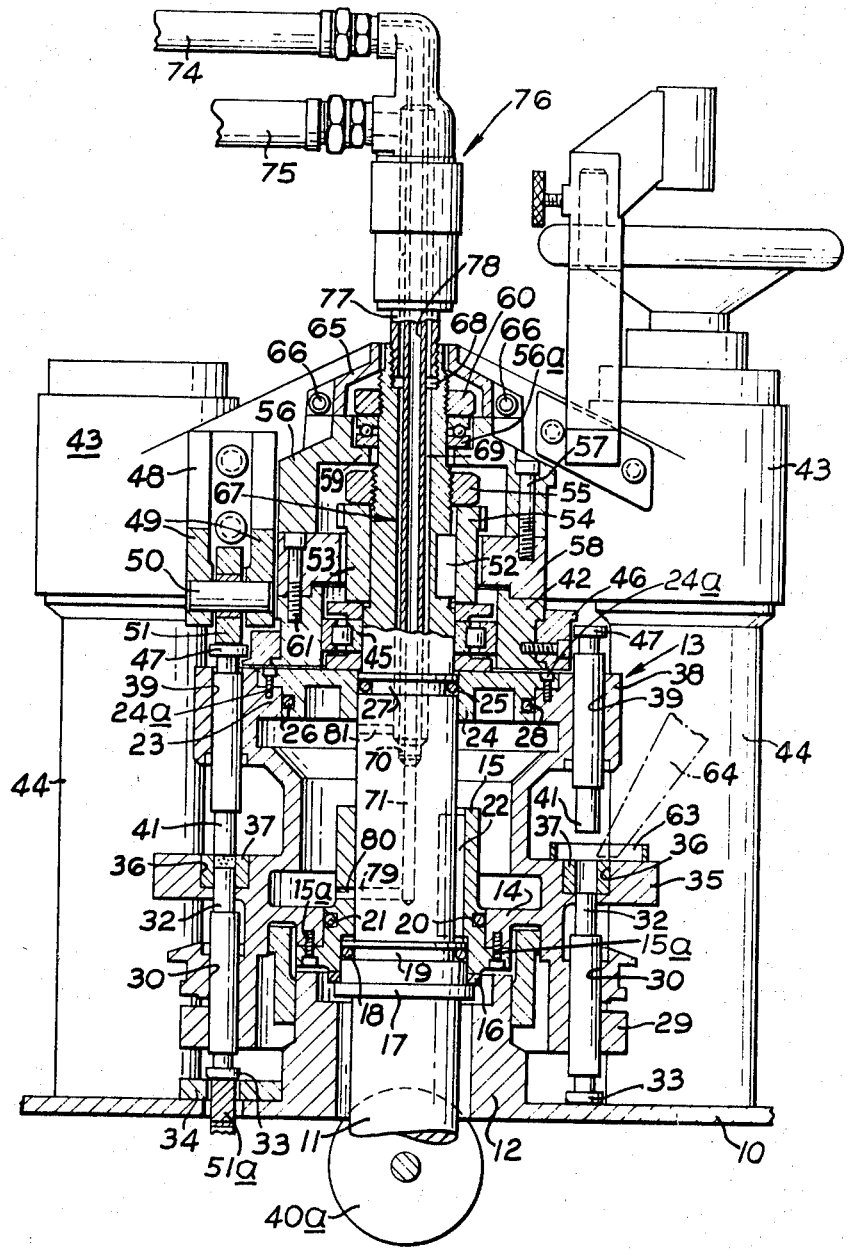

This invention concerns rotary tablet-making machines of the type (hereinafter referred to as "of the type described") incorporating a rotary turret having a die plate or table and formed with top and bottom punch guides accommodating respective punches cooperating with corresponding dies in the die plate and means for supplying granular or pulverulent material to the dies to be compressed into tablet form by the punches.

In the operation of such machines, heat is generated, particularly at the punches, during compression of the material, and also due to friction, with the result that the punches and dies attain a running temperature which is considerably higher than the ambient atmospheric temperature. Accordingly, heat-sensitive materials cannot reliably be formed into tablets with such machines, unless special precautions are taken to ensure that the dies and punches do not become too hot. One way of this is to run the machine for only short periods with intervening rest periods during which cooling can take place. Another proposal hitherto employed is to supply carbon dioxide to the material supply means so as to provide a current of cooling gas over the regions which are susceptible to heat propagation, but this is not very effective and results in blowing-about of the material to be tabletted, particularly in the case where such material is finely powdered. A third method is to pack the ouside of the turret with Dry Ice prior to tabletting.

An object of this invention is to provide an arrangement wherein the aforementioned difficulties are obviated, and which provides for particularly efficient cooling of the dies and/or punches, and with this object in view the present invention provides a rotary tablet-making machine of the type described characterised in that the turret thereof is hollow, and means are provided to permit circulation of a cooling fluid, such as water, therethrough.

In order that the invention may be fully understood, it will be described further, by way of example, with reference to the details of a practical embodiment thereof, and with reference to the accompanying drawings, in which:

FIG. 1 is a cross-sectional side elevation of a preferred embodiment of the tabletting machine of the invention;
FIG. 2 is a fragmentary plan view showing the cooling fluid connections of the machine of FIG. 1; and
FIG. 3 is an enlarged detail of part of FIG. 1.

The illustrated rotary tablet-making machine comprises a suitable base frame 10 enclosing a drive motor and gearing (not shown) for driving a vertical drive shaft 11 which projects upwards through a boss 12 of the frame 10 and supports a turret 13 above the latter.

The turret 13 is generally of overall hollow cylindrical form, with its axis disposed vertically, and is formed, at its lower end, with an inwardly-directed lower flange 14 providing a mounting for a sleeve-like bottom cap 15 which is a snug fit on the drive shaft 11 and rests down by way of a spacer ring 16 on a shoulder 17 provided on the drive shaft 11. A O-ring 18 provided in a recess 19 in a location so as to be surrounded by the bottom cap 15 serves to provide a seal between the bottom cap 15 and the shaft 11 and a similar O-ring 20 in a groove 21 around the bottom cap 15 where the latter is surrounded by the inwardly-directed lower flange 14 of the turret 13 serves to provide a seal between the bottom cap 15 and such lower flange 14. The bottom cap 15 is secured to the turret lower flange by countersunk cap screws 15a.

A key 22 set into the bottom cap 15 and the drive shaft 11 constrains the bottom cap 15, and therefore the turret 13, to rotate with the drive shaft 11.

At the upper end, the turret 13 is formed with an inwardly-directed upper flange 23 into which an annular top cap 24, having a substantially flat upper surface, is a snug fit so as to surround the drive shaft 11. Corresponding O-rings 25 and 26 set respectively in a circumferential recess 27 in the drive shaft 11 and a circumferential recess 28 in the top cap 24 serve respectively to seal the top cap 24 relative to the shaft 11 and the upper flange 23 relative to the top cap 24. The top cap 24 is secured to the turret upper flange 23 by countersunk cap screws 24a.

The turret 13 is formed, at its lower end, with an integral lower depending skirt 29 generally of annular form and generally of substantially square radial cross-section. This skirt 29 has vertical bores 30 therethrough at intervals around the turret, such bores 30 slidably accommodating respective bottom punches 32. These bottom punches 32 each have an enlarged foot portion 33 cooperating with a bottom cam 34 fixedly mounted around the boss 12 of the frame 10, such bottom cams 34 serving to raise and lower the bottom punches as the turret 13 revolves relative to the frame 10 of the machine.

Also formed integrally with the turret's body at a location spaced slightly above the skirt 29 just described is an outwardly directed flange-like portion 35 which constitutes a die table or plate. This die plate 35 has vertical die bores 36 at intervals therearound each such bore 36 being in register with a respective one of the bottom punches 32 and accommodating a respective die 37 corresponding to the overall outer tablet shape to be produced. The upper ends of the bottom punches 32 project upwards into and are a snug sliding fit in the respective dies 37.

Further formed integrally with the turret's body is an upper external flange-like rim 38, this being bored as at 39 at corresponding intervals and slidably accommodating top punches 41.

Surrounding the drive shaft 11 immediately above the top cap 24 of the turret 13 is an upper cam body 42, this being fixedly mounted by being appropriately connected to a stationary upper roll support 43 extending above the frame 10 of the machine to one side of the turret 13 (see FIG. 2) and supported at a level just above the upper cam body 42 by a pair of vertical pillars 44. A roller bearing 45 between such upper cam body 42 and the drive shaft 11 journals the latter for rotation in the cam body 42 which carries, on its outer curved surface, an upper cam 46 cooperating with enlarged heads 47 on the top punches 41 for raising the latter clear of the respective dies 37 and lowering them so that their bottom ends enter into the dies 37 as the turret 13 rotates.

Bolted onto upper roll support 43 is a heavy bracket 48 providing two arms 49 in which is journalled a pivot pin 50 on which is a precompression roll 51, being disposed above a predetermined location on the upper rim 38 of the turret 13 so that as the top punches 41 pass thereunder their upper ends or heads 47 are engaged by the pressure roll 51. Directly below the upper precompression roll 51 and mounted in the framework 10 is a similar lower precompression roll 51a which engages with the lower ends or heads 33 of the bottom punches 32. As the turret 13 rotates the top and bottom punches 41, 32 engage the rolls 51, 51a for applying substantial precompression to material in the dies 37. Large diameter upper and lower final pressure rolls 40, 40a are positioned at the rear of the machine, respectively in the upper roll support 43 and the frame 10, for applying final tabletting pressure to material in the dies 37.

Keyed at 52 onto the drive shaft 11 approximately in alignment with the upper roll support 43 is a sleeve-like boss 53 of a feeder-driving gear wheel 54 and a nut 55 screwed onto a threaded portion of the shaft 11 thereabove serves to clamp the gear wheel 54 downwards against the inner race of the roller bearing 45 by which the drive shaft 11 is journalled within the upper cam body 42. The gear wheel 54 is masked by a dished cover 56 through which the upper end of the drive shaft 11 projects, such cover 56 being held down onto an annulus 58 formed integrally with the upper roll support 43 by bolts 57, the shaft 11 being journalled in the cover 56 by an axial thrust bearing 56a which abuts an inner flange 59 of the cover 56 and is abutted by a hold down nut 60 on the shaft 11. The annulus 58, in turn, is secured to the upper cam body 42 by bolts 61. The cover 56 masks intermediate gears (not shown) meshing with the gear wheel 54 and serving to drive a pulverulent material feed (not shown) which is fed by a hopper 62 (FIG. 2) mounted to one side of the turret 13 and serves to feed material by way of a feeder outlet 64 (FIG. 1) to a feed shoe 63 on the die plate 35 for filling the dies 37 as they pass under the shoe 63.

The cover hold-down nut 60, in turn, is masked by a centrally-apertured top cap 65 which is bolted as at 66 to the upper roll support 43, and the drive shaft 11 terminates, at its upper end, substantially flush with the upper edge of the top cap 65.

The drive shaft 11 has an internal bore 67 extending axially therethrough from its top and down to approximately the level of the lower inwardly-directed flange 14 of the turret 13, this bore being (as shown in detail in FIG. 3) effectively in four parts, namely a wide internally-threaded socket part 68 at its upper end, a return passage 69 (of somewhat smaller diameter than the socket part 68) extending from the socket part 68 to just below the level of the top cap 24 of the turret 13, an intermediate sealing part 70 of short axial length and of slightly smaller diameter than the return passage 69, and a lower smallest-diameter water inlet part 71, the intermediate sealing part 70 accordingly serving to join the water inlet part 71 and the return passage 69 and merging therewith at narrow annular shoulders 72 and 73 (FIG. 3).

The bore 67 just described is coupled to cooling water supply and return pipes 74 and 75 respectively by way of a rotary joint 76 which includes an externally-threaded spigot 77 screwed into the socket part 68 of the bore 67 and an inner coaxial siphon tube 78 projecting downwards through the spigot 77 and the return passage 69 (with a clearance relative to the walls of the latter) to mate into the intermediate sealing part 70 of the bore 67. The water supply pipe 74 connects, through the rotary joint 76, with the interior of the siphon tube 78, and the water return pipe 75 connects, through the rotary joint 76, with the annular space between the spigot 77 and the siphon tube 78 so that the return passage 69 (externally of the siphon tube 78) is in communication with the return pipe 75.

A radial water inlet passage 79 (FIG. 1) is provided in the shaft 11 at a level just above the lower flange 14 of the turret 13 and an aperture 80 is provided through the bottom cap 15 in register therewith. This radial inlet passage 79, therefore, serves to connect the water inlet part 71 of the bore 67 of the shaft 11 with the interior of the turret 13.

Correspondingly, a radial water outlet passage 81 is provided in the shaft 11 just below the level of the top cap 24 of the turret 13, and this serves to join the upper part of the interior of the turret 13 to the return passage part 69 of the bore 67 of the drive shaft 11.

The machine as described operates in conventional manner to produce compressed tablets from powdered or pulverulent material fed to the dies 37 from the feeder 62, by being compressed between the upper and lower punches 41, 32 upon rotation of the turret 13. During such operation, cooling water is supplied by way of the supply pipe 74 and passes through the rotary joint 76, the siphon tube 78, the water inlet part 71 of the bore 67 of the drive shaft 11, and the radial water inlet passage 79, to the interior of the turret 13 near the bottom thereof. Corresponding return flow of water from the interior of the turret 13 to the return pipe 75 occurs by way of the radial water outlet passage 81, the return passage 69 in the shaft 1 externally of the siphon tube 78, the spigot 77 and the rotary joint 76. So long as the water fed to the interior of the turret is maintained at an appropriately low temperature, e.g. corresponding approximately to the temperature of the ambient surrounding atmosphere, it serve adequately to cool those parts of the machine (more particularly the punches 32, 41 and the dies 37 and the closely adjacent turret parts) which are susceptible to temperature increase during the machine's operation, and accordingly enables the machine to be employed for tabletting materials which are sensitive to heat.

The cooling water may be drawn from a mains supply and the return taken to a drain, or alternatively a recirculating system, incorporating a heat exchanger to cool the return water, may be employed.

The invention is not confined to the precise described construction of machine and can, of course, be applied to any form of rotary tabletting machine.

Cooling fluids other than water, e.g. carbon dioxide, methyl glycol, brine, or alcohol, may be employed.

I claim:

1. In a rotary tablet-making machine of the type incorporating a rotary turret having a die plate and upper and lower punch guides accommodating respective upper and lower punches cooperating with corresponding dies in the die plate and means for supplying pulverulent material from a feeder to the dies for compression between the upper and lower punches, the improvement comprising:

a motor-driven centrally-bored drive shaft having an internal central bore, a siphon tube concentrically arranged within the bore of the drive shaft, the turret being hollow and mounted concentrically of the drive shaft, a source of cooling fluid, a joint disposed between the source and the bore of the drive shaft for leading the cooling fluid from the source to the siphon tube and from the bore of the drive shaft exteriorly of the siphon tube to the source, a feed conduit communicating between the siphon tube and the turret interior, and a return conduit connecting between the interior of the turret and the central bore of the drive shaft exteriorly of the siphon tube.

2. In the rotary tablet-making machine of claim 1, including: top and bottom caps on the drive shaft for sealing the turret relative to the drive shaft.

References Cited

UNITED STATES PATENTS

| | | | |
|---|---|---|---|
| 901,937 | 10/1908 | Scott | 107—17 |
| 1,289,570 | 12/1918 | Stokes | 107—17 |
| 1,936,582 | 11/1933 | Clapp et al. | |
| 1,996,500 | 4/1935 | Adams. | |
| 2,670,697 | 3/1954 | Meakin | 107—14 |
| 2,936,158 | 5/1960 | Ramundo | 100—93 |

WALTER A. SCHELL, Primary Examiner

R. I. SMITH, Assistant Examiner

U.S. Cl. X.R.

18—16.5; 25—65; 100—93